US012461385B1

(12) United States Patent
Forte

(10) Patent No.: US 12,461,385 B1
(45) Date of Patent: Nov. 4, 2025

(54) HOLOGRAPHIC AND PROJECTED IMAGE DISPLAY APPARATUS

(71) Applicant: Douglas Forte, Chugiak, AK (US)

(72) Inventor: Douglas Forte, Chugiak, AK (US)

( * ) Notice: Subject to any disclaimer, the term of this patent is extended or adjusted under 35 U.S.C. 154(b) by 0 days.

(21) Appl. No.: 18/889,038

(22) Filed: Sep. 18, 2024

(51) Int. Cl.
*G02B 30/56* (2020.01)
*G03B 21/10* (2006.01)
*G09G 3/00* (2006.01)

(52) U.S. Cl.
CPC .............. *G02B 30/56* (2020.01); *G03B 21/10* (2013.01); *G09G 3/001* (2013.01); *G09G 2320/0606* (2013.01); *G09G 2320/0626* (2013.01); *G09G 2340/045* (2013.01); *G09G 2354/00* (2013.01); *G09G 2370/16* (2013.01)

(58) Field of Classification Search
CPC ...................................................... G09G 3/001
See application file for complete search history.

(56) References Cited

U.S. PATENT DOCUMENTS

| 10,516,863 | B1 | 12/2019 | Baker |
| 10,762,812 | B1 | 9/2020 | Thornton |
| 11,526,024 | B2 | 12/2022 | Kim |
| D1,001,870 | S | 10/2023 | Chen |
| D1,009,969 | S | 1/2024 | Griffith |
| 2004/0001111 | A1* | 1/2004 | Fitzmaurice ........ G06F 3/04815 715/848 |
| 2014/0160145 | A1* | 6/2014 | Kim ..................... G03H 1/02 345/682 |
| 2019/0155033 | A1* | 5/2019 | Gelman ............ G02B 27/0179 |
| 2020/0257126 | A1* | 8/2020 | Schmalenberg .... G06F 3/04815 |

FOREIGN PATENT DOCUMENTS

WO       WO2013160782       10/2013

* cited by examiner

*Primary Examiner* — Gustavo Polo

(57) ABSTRACT

A display and lighting apparatus for projecting three-dimensional and two-dimensional images includes a base and a casing which is coupled to and extends over the base. The casing defines a volume therein and comprises a transparent material such that the volume is viewable from outside the casing through the casing. A holographic projector is mounted on the base in the volume of the casing and is configured to project holographic images into the volume. A processor is operatively coupled to the holographic projector.

13 Claims, 5 Drawing Sheets

HOLOGRAPHIC AND PROJECTED IMAGE DISPLAY APPARATUS

CROSS-REFERENCE TO RELATED APPLICATIONS

Not Applicable

Statement Regarding Federally Sponsored Research or Development

Not Applicable

The Names of the Parties to a Joint Research Agreement

Not Applicable

Incorporation-by-Reference of Material Submitted on a Compact Disc or as a Text File Via the Office Electronic Filing System Not Applicable Statement Regarding Prior Disclosures by the Inventor or Joint Inventor Not Applicable

BACKGROUND OF THE INVENTION

Field of the Invention

The disclosure relates to display apparatuses and more particularly pertains to a new display apparatus for projecting three-dimensional and two-dimensional images.

Description of Related Art Including Information Disclosed Under 37 CFR 1.97 and 1.98

The prior art discloses various display apparatuses which project images in myriad ways, including projection of three-dimensional images within a casing. However, the prior art fails to describe such an apparatus which projects three-dimensional images within a transparent casing while projecting associated two-dimensional images or other lighting outwardly from the casing.

Brief Summary of the Invention

An embodiment of the disclosure meets the needs presented above by generally comprising a base and a casing which is coupled to and extends over the base. The casing defines a volume therein and comprises a transparent material such that the volume is viewable from outside the casing through the casing. A holographic projector is mounted on the base in the volume of the casing and is configured to project holographic images into the volume. A processor is operatively coupled to the holographic projector.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
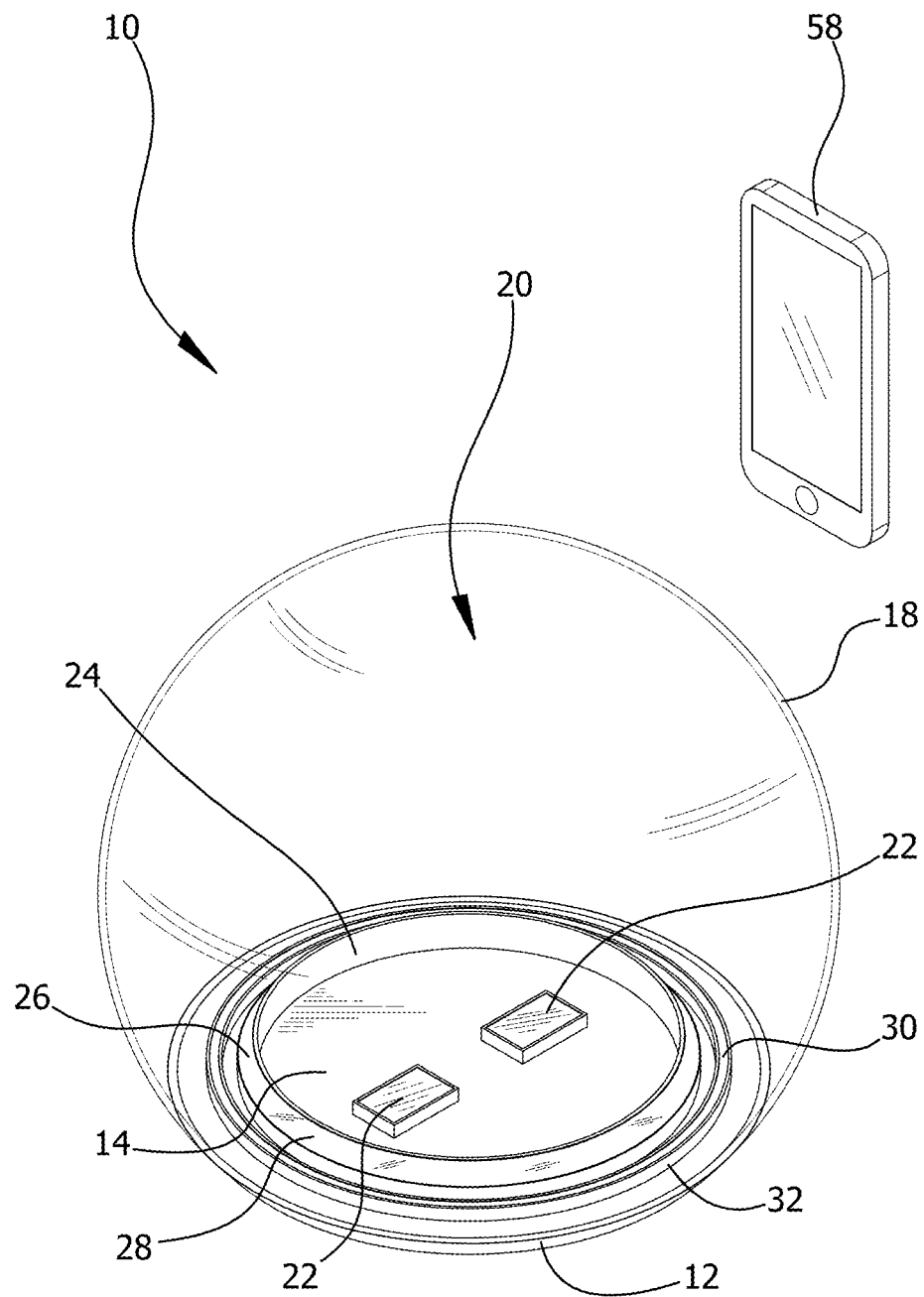
FIG. 1 is a top perspective view of a display and lighting apparatus according to an embodiment of the disclosure.
Figure 2:
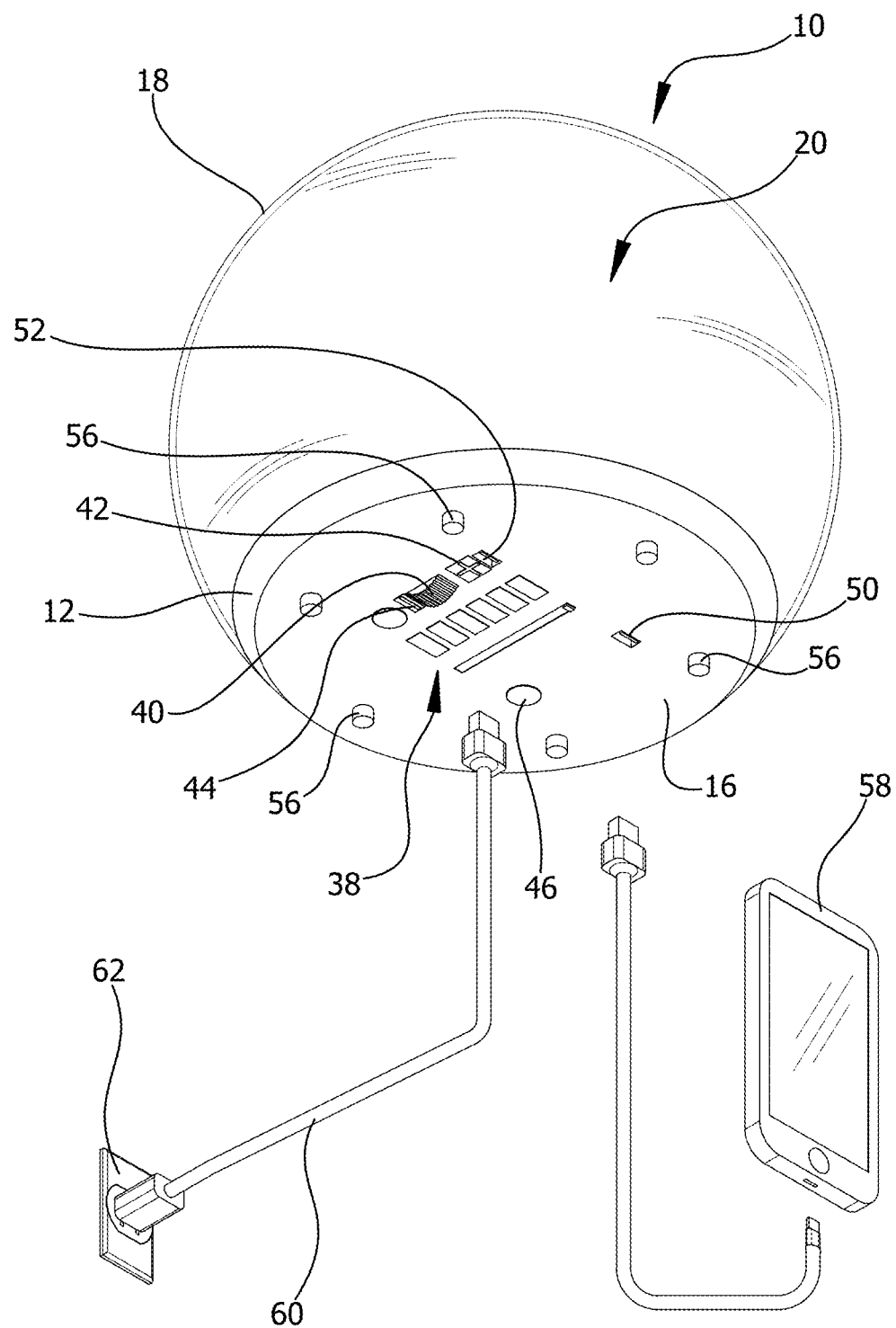
FIG. 2 is a bottom perspective view of an embodiment of the disclosure.
Figure 3:
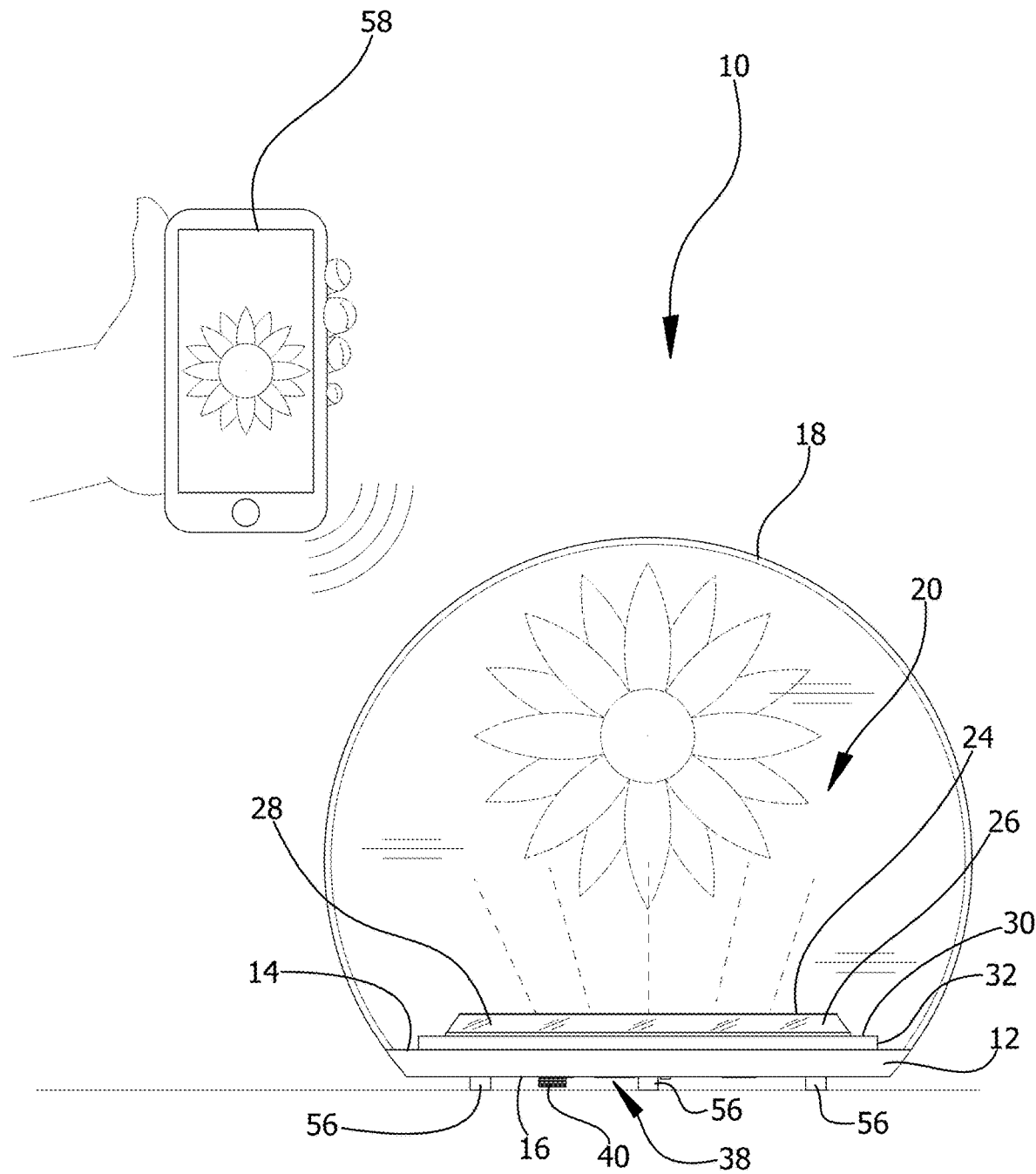
FIG. 3 is a side in-use view of an embodiment of the disclosure. An example of a holographic image is shown projected into a volume of a casing.
Figure 4:
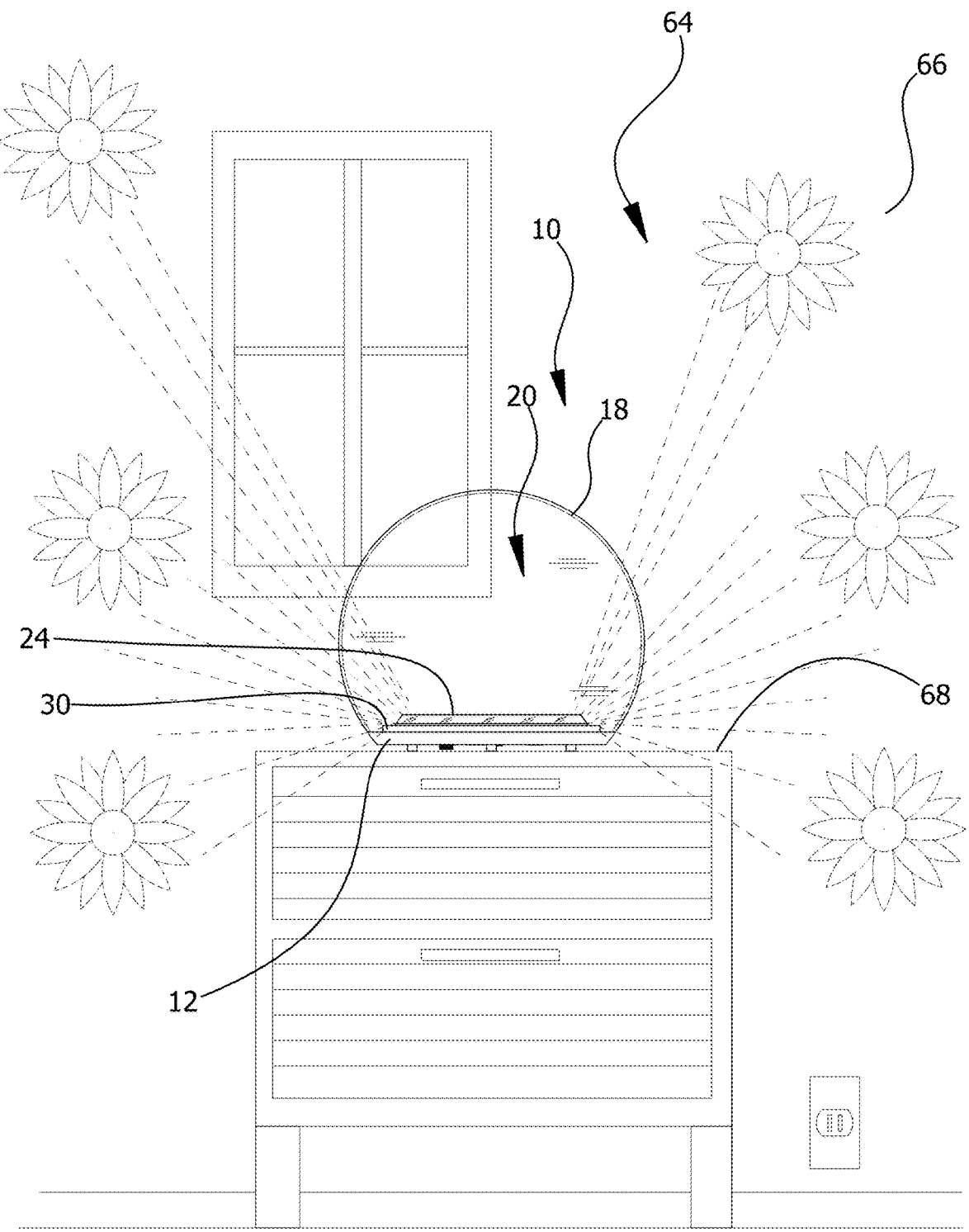
FIG. 4 is an in-use view of an embodiment of the disclosure within a surrounding enclosure. An example of images projected onto interior surfaces of the surrounding enclosure is shown.
Figure 5:
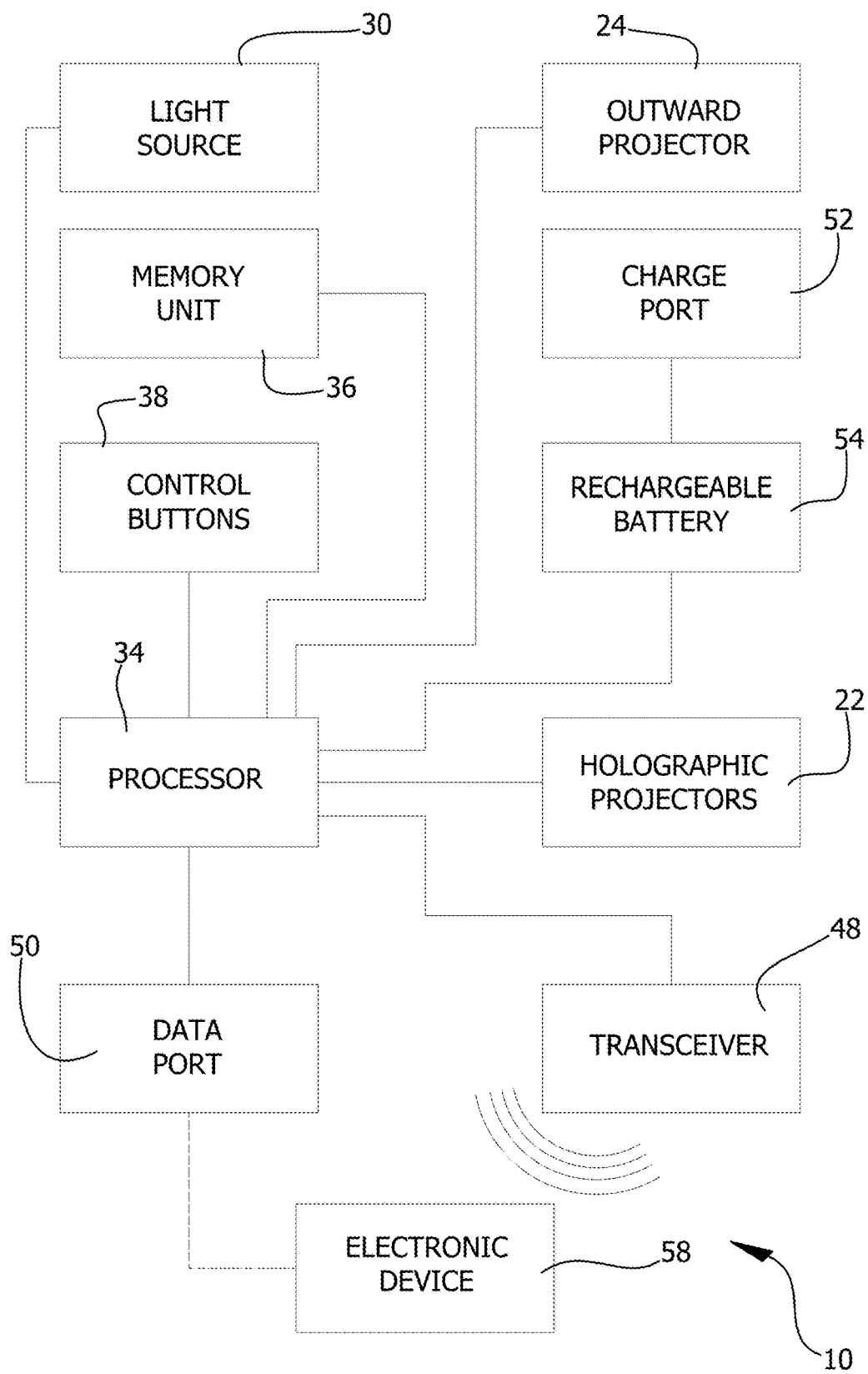
FIG. 5 is a block diagram of an embodiment of the disclosure.

With reference now to the drawings, and in particular to FIGS. 1 through 5 thereof, a new display apparatus embodying the principles and concepts of an embodiment of the disclosure and generally designated by the reference numeral 10 will be described.

As best illustrated in FIGS. 1 through 5, the display and lighting apparatus 10 generally comprises a base 12 and a casing 18 which is coupled to and extends over the base 12. The casing 18 defines a volume 20 therein, and the base 12 is positioned below the volume 20. The casing 18 comprises a transparent material such as a glass, a plastic, or the like such that visible light may be emitted through the casing 18. The casing 18 has a dome shape but may have other shapes in other embodiments, such as a cube shape, other prismatic shapes, polyhedrons, or the like. A pair of holographic projectors 22 is mounted on the base 12 in the volume 20 of the casing 18. The holographic projectors 22 are configured to project holographic images into the volume 20. A processor 34 is operatively coupled to the pair of holographic projectors 22 and is mounted in the base 12.

An outward projector 24 is also mounted on the base 12 in the volume 20 of the casing 18 and is operatively coupled to the processor 34. The outward projector 24 has a light-emitting portion 26 which has a circular ring shape which lies atop and substantially parallel to a top surface 14 of the base 12 and is oriented to project light radially outwardly from the volume 20 of the casing 18 through the casing 18. The light-emitting portion 26 extends around a perimeter 28 of the outward projector 24. The outward projector 24 may thus be operated to project images on interior surfaces 66 of a surrounding enclosure 64 such as a room. The light-emitting portion 26 may comprise one or more light emitters such as light-emitting diodes, light bulbs, or the like.

One or more lenses may be used to focus projected images on the interior surfaces 66 of the surrounding enclosure 64. In other embodiments, the outward projector 24 may have a light-emitting portion 26 with a different shape. The light-emitting portion 26 may be shaped as a rectangular loop, a triangular loop, or any other shape which facilitates projecting light in multiple directions away from the casing 18. In some embodiments, the outward projector 24 may be one of multiple projectors arranged to face in multiple directions, and the multiple projectors may be arranged in a loop or similar to facilitate the function described.

A light source 30 is also mounted on the base 12 in the volume 20 of the casing 18 and is operatively coupled to the processor 34. The light source 30 may emit lighting without a particular image being projected. The light source 30 is oriented and configured to emit light out of the volume 20 through the casing 18 in a plurality of directions away from a periphery 32 of the light source 30. The light source 30 also has a circular ring shape. The light source 30 surrounds the outward projector 24 which surrounds the holographic projectors 22. The light source 30 may have one or more light-emitting components such as light-emitting diodes, light bulbs, or the like, and the light-emitting components may emit light of different wavelengths. In some embodiments, multicolor light-emitting components may be used which may be operated to emit selected wavelengths.

Three-dimensional image data for the holographic images projected by the holographic projectors 22, two-dimensional image data for the images projected by the outward projector 24, and lighting designs for use with the light source 30 may be accessed from a memory 36 operatively coupled to the processor 34 or from a remote electronic device 58, such as a smartphone, a tablet, a computer, or the like. A transceiver 48 is operatively coupled to the processor 34 to facilitate wireless communication with the remote electronic device 58. A data port 50 is coupled to the base 12 and electrically coupled to the processor 34 that the remote electronic device 58 may transfer data to the processor 34 for use or for storage on the memory 36 via the data port 50. In some embodiments, the processor 34 may be controlled by an application on the remote electronic device 58.

A control interface 38 is operatively coupled to the processor 34 and is mounted on a bottom side 16 of the base 12. The control interface 38 is operable to adjust a variety of parameters, including a brightness of the holographic image, a size of the holographic image, a brightness of light emitted by the outward projector 24, and a brightness of light emitted by the light source 30. The control interface 38 includes a scroll wheel 40 to facilitate these functions. The processor 34 is programmed to increase a selected one of the parameters by rotating the scroll wheel 40 in a first rotational direction and to decrease the selected parameter by rotating the scroll wheel 40 in a second rotational direction opposite the first rotational direction. Selection of which parameter is being adjusted may be made via other buttons or other input means.

Adjustment of one of the parameters may also be made via an increase parameter button 42 and a decrease parameter button 44 of the control interface 38. The processor 34 is programmed to increase the parameter when the increase parameter button 42 is pressed and to decrease the parameter when the decrease parameter button 44 is pressed. The control interface 38 may also include a power button 46 to alternately activate and deactivate the processor 34.

A power supply 54 is electrically coupled to the processor 34. The power supply 54 comprises a battery but may comprise a capacitor or other suitable energy storage. A charge port 52 is coupled to the base 12 and is electrically coupled to the power supply 54. The power supply 54 may thus be charged via the charge port 52 and a charge cord 60 from an external power source 62. In some embodiments, only an external power source 62 is used to power the display and lighting apparatus 10. A plurality of legs 56 is coupled to the bottom side 16 of the base 12 to support the base 12 over a support surface 68 and provide clearance between the control interface 38 and the support surface 68.

In use, three-dimensional image data from the memory 36, the remote electronic device 58, or the like is projected into the volume 20 such that viewers may observe the resulting holographic image from outside the casing 18. The outward projector 24 may be used to project other images onto the interior surfaces 66 of the surrounding enclosure 64. These other images may also be derived from or otherwise associated with the three-dimensional image data. For example, a three-dimensional image of a flower may be projected into the volume 20 via one or both of the holographic projectors 22 while one or more two-dimensional images representing one or more perspectives of the three-dimensional image of the flower may be projected onto interior surfaces 66 of the surrounding enclosure 64. The light source 30 may also be operated to emit light out of the casing 18. For example, the light source 30 may be used in conjunction with the holographic projectors 22 or the outward projector 24 to add ambient lighting to the projections displayed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A display and lighting apparatus comprising:
   a base;
   a casing coupled to and extending over the base, the casing defining a volume therein, the casing comprising a transparent material;
   a holographic projector mounted on the base in the volume of the casing, the holographic projector being configured to project holographic images into the volume;
   a processor operatively coupled to the holographic projector; and
   an outward projector mounted on the base in the volume of the casing and operatively coupled to the processor, the outward projector being oriented and configured to project non-holographic images out of the volume through the casing, the outward projector having a light-emitting portion which is configured to emit light in a plurality of directions outwardly away from a perimeter of the outward projector whereby the outward projector is configured to project the non-holographic images outwardly relative to the volume onto interior surfaces of a surrounding enclosure, the perimeter lying substantially parallel to a top surface of the base.

2. The display and lighting apparatus of claim 1, wherein the casing has a dome shape.

3. The display and lighting apparatus of claim 1, further comprising a light source mounted on the base in the volume of the casing and operatively coupled to the processor, the light source being oriented and configured to emit light out of the volume through the casing in a plurality of directions away from a periphery of the light source.

4. The display and lighting apparatus of claim 1, further comprising a transceiver operatively coupled to the processor, the processor being configured to be in wireless communication with a remote electronic device via the transceiver.

5. The display and lighting apparatus of claim 1, further comprising a memory operatively coupled to the processor.

6. The display and lighting apparatus of claim 1, further comprising a control interface operatively coupled to the processor and mounted on a bottom side of the base.

7. The display and lighting apparatus of claim 6, wherein the control interface is operable to adjust a brightness of the holographic images.

8. The display and lighting apparatus of claim 6, wherein the control interface is operable to adjust a size of the holographic images.

9. The display and lighting apparatus of claim 1, further comprising a power supply electrically coupled to the processor.

10. The display and lighting apparatus of claim 9, wherein the power supply comprises a battery.

11. The display and lighting apparatus of claim 9, further comprising a charge port coupled to the base and electrically coupled to the power supply.

12. The display and lighting apparatus of claim 1, further comprising a data port coupled to the base and electrically coupled to the processor, the data port being configured to facilitate communication between the processor and a remote electronic device.

13. A display and lighting apparatus comprising:
a base;
a casing coupled to and extending over the base, the casing defining a volume therein, the casing comprising a transparent material, the casing having a dome shape;
a pair of holographic projectors mounted on the base in the volume of the casing, the pair of holographic projectors being configured to project holographic images into the volume;
a processor operatively coupled to the pair of holographic projectors and mounted in the base;
an outward projector mounted on the base in the volume of the casing and operatively coupled to the processor, the outward projector being oriented and configured to project images out of the volume through the casing, the outward projector having a light-emitting portion which is configured to emit light in a plurality of directions outwardly away from a perimeter of the outward projector, the perimeter lying substantially parallel to a top surface of the base;
a light source mounted on the base in the volume of the casing and operatively coupled to the processor, the light source being oriented and configured to emit light out of the volume through the casing in a plurality of directions away from a periphery of the light source;
a transceiver operatively coupled to the processor, the processor being configured to be in wireless communication with a remote electronic device via the transceiver;
a memory operatively coupled to the processor;
a control interface operatively coupled to the processor and mounted on a bottom side of the base, the control interface being operable to adjust a brightness of the holographic images, the control interface being operable to adjust a size of the holographic images, the control interface being operable to adjust a brightness of light emitted by the outward projector, the control interface being operable to adjust a brightness of light emitted by the light source;
a power supply electrically coupled to the processor, the power supply comprising a battery;
a charge port coupled to the base and electrically coupled to the power supply; and
a data port coupled to the base and electrically coupled to the processor, the data port being configured to facilitate communication between the processor and the remote electronic device.

\* \* \* \* \*